(12) United States Patent
Detchemendy

(10) Patent No.: US 11,886,616 B2
(45) Date of Patent: *Jan. 30, 2024

(54) SYSTEMS AND METHODS FOR TRACKING DATA PROTECTION COMPLIANCE OF ENTITIES THAT USE PERSONALLY IDENTIFYING INFORMATION (PII)

(71) Applicant: Mastercard International Incorporated, Purchase, NY (US)

(72) Inventor: Stephanie Detchemendy, Wentzville, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/169,470

(22) Filed: Feb. 15, 2023

(65) Prior Publication Data

US 2023/0195929 A1    Jun. 22, 2023

Related U.S. Application Data

(63) Continuation of application No. 16/855,748, filed on Apr. 22, 2020, now Pat. No. 11,586,763.

(51) Int. Cl.
*G06F 21/62* (2013.01)
(52) U.S. Cl.
CPC ................. *G06F 21/6245* (2013.01)
(58) Field of Classification Search
CPC . G06F 21/6245; G06F 21/604; H04L 63/108; H04L 63/1425

USPC ........................................................... 726/1
See application file for complete search history.

(56) References Cited

U.S. PATENT DOCUMENTS

| | | | |
|---|---|---|---|
| 9,092,796 B2 | 7/2015 | Eversoll et al. | |
| 9,542,553 B1 | 1/2017 | Burger et al. | |
| 9,792,648 B1 | 10/2017 | Haller et al. | |
| 9,853,959 B1 | 12/2017 | Kapczynski et al. | |
| 9,984,252 B2 | 5/2018 | Pollard | |
| 10,019,588 B2* | 7/2018 | Garcia | G06F 21/604 |
| 10,776,515 B2* | 9/2020 | Barday | G06F 21/31 |
| 10,789,383 B1* | 9/2020 | Watson | G06F 21/6218 |
| 2007/0106754 A1* | 5/2007 | Moore | G16H 40/20 |
| | | | 707/E17.116 |
| 2019/0180052 A1* | 6/2019 | Barday | H04L 67/51 |

(Continued)

*Primary Examiner* — Jeffrey C Pwu
*Assistant Examiner* — Nega Woldemariam
(74) *Attorney, Agent, or Firm* — Armstrong Teasdale LLP

(57) ABSTRACT

A data management computing system for tracking data protection compliance of a plurality of entities using a data management ("DM") server is provided. The DM server includes at least one processor programmed to: (i) receive, from a requesting entity, a personally identifying information ("PII") consent request for access to a requested PII set of a user, (ii) determine at least one PII item associated with a reason code, (iii) compare the at least one PII item to the requested PII set, (iv) generate a consent recommendation, (v) transmit the consent recommendation to the user, (vi) receive a response indicating user consent, (vii) transmit, to the requesting entity, a notification indicating the user consent for the requesting entity to retrieve the at least one PII item from a third-party PII storage entity, and (viii) update a user profile to track the requesting entity with the at least one PII item.

20 Claims, 9 Drawing Sheets

(56) References Cited

U.S. PATENT DOCUMENTS

| | | | |
|---|---|---|---|
| 2020/0134229 A1* | 4/2020 | Ranger | H04L 63/0428 |
| 2020/0320207 A1* | 10/2020 | Beno | G06F 21/64 |
| 2021/0042428 A1 | 2/2021 | Daftary et al. | |
| 2021/0256163 A1* | 8/2021 | Fleming | G06F 21/6272 |
| 2021/0334402 A1* | 10/2021 | Detchemendy | H04L 63/1425 |
| 2022/0138331 A1* | 5/2022 | Daftary | G06F 21/6245 726/26 |

* cited by examiner

SYSTEMS AND METHODS FOR TRACKING DATA PROTECTION COMPLIANCE OF ENTITIES THAT USE PERSONALLY IDENTIFYING INFORMATION (PII)

CROSS REFERENCE TO RELATED APPLICATIONS

This application is a continuation application of U.S. patent application Ser. No. 16/855,748, filed Apr. 22, 2020, entitled "SYSTEMS AND METHODS FOR TRACKING DATA PROTECTION COMPLIANCE OF ENTITIES THAT USE PERSONALLY IDENTIFYING INFORMATION (PII)", the disclosure of which is incorporated herein by reference in its entirety.

BACKGROUND

The present application relates generally to managing the propagation of personally identifying information ("PII"), and more specifically, to a system and method for tracking data protection compliance of entities that use PII.

Data breaches, security incidents, and the sale of customer data to third party buyers are some of the reasons that many individuals are becoming increasingly wary of entities (e.g., companies and organization) that access their personal data. Most individuals maintain PII sharing relationships with a number of entities, such as an employer, one or more financial institutions, and service providers (e.g., utility company, internet company). Often times, individuals are not fully aware of each PII item that is stored by these entities. Further, many individuals are not aware of each activity (e.g., marketing, advertising) for which their PII is being used. Thus, there exists a lack of transparency between many PII-using entities and individuals when it comes to how PII is being handled and used. Often, this makes it increasingly difficult for an individual to trust entities with their PII.

Further, instead of blindly consenting to every PII item requested, many individuals want to be able to make informed decisions when it comes to sharing their PII. Also, even after providing consent, those concerned with unnecessarily oversharing personal data and/or data privacy concerns may want to be able to actively control how long their PII items are accessed and stored by these entities. Accordingly, it is desirable to have a system that enables users to directly manage and control the PII items that are shared with entities by allowing users to not only track the PII items accessed by specific entities, but also to provide informed consent as well as withdrawal of consent.

BRIEF DESCRIPTION

In one aspect, a data management computing system for tracking data protection compliance of a plurality of entities using personally identifying information ("PII") is provided. The data management computing system comprising a data management ("DM") server in communication with a user computing device associated with a user and a requesting entity. The DM server comprises a memory device for storing data. The memory device includes a user profile associated with the user. The memory device also includes a records database. The records database includes a plurality of compliance records generated by the DM server to track interactions between the DM server and the requesting entity. The DM server further comprises at least one processor communicatively coupled to the memory device. The at least one processor is programmed to receive, from the requesting entity, a PII consent request for access to a requested PII set of the user. The PII consent request identifies a reason code associated with the requested PII set. The at least one processor is also programmed to determine, based on the PII consent request, at least one PII item associated with the reason code. The at least one processor is also programmed to compare the at least one PII item to the requested PII set, and generate, based on the comparison, a consent recommendation. The consent recommendation provides a course of action regarding the at least one PII item. The at least one processor is also programmed to transmit the consent recommendation to the user computing device, and receive, from the user computing device, in response to the consent recommendation, a response indicating user consent for the requesting entity to access the at least one PII item. The at least one processor is also programmed to transmit, to the requesting entity, a notification indicating the user consent for the requesting entity to retrieve the at least one PII item from a third-party PII storage entity. The at least one processor is also programmed to update, in the memory device, the user profile to track the requesting entity with the at least one PII item.

In another aspect, a computer-implemented method for tracking data protection compliance of a plurality of entities using a data management computing system is provided. The data management computing system includes a data management ("DM") server in communication with a user computing device associated with a user and a requesting entity. The DM server includes at least one processor communicatively coupled to a memory device. The method includes storing, in the memory device, a user profile associated with the user. The memory device includes a records database. The records database includes a plurality of compliance records generated by the DM server to track interactions between the DM server and the requesting entity. The method also includes receiving, by the DM server, from the requesting entity, a personally identifying information ("PII") consent request for access to a requested PII set of the user. The PII consent request identifies a reason code associated with the requested PII set. The method also includes determining, based on the PII consent request, at least one PII item associated with the reason code. The method also includes comparing, by the DM server, the at least one PII item to the requested PII set. The method also includes generating, by the DM server, based on the comparison, a consent recommendation. The consent recommendation provides a course of action regarding the at least one PII item. The method also includes transmitting, by the DM server, the consent recommendation to the user computing device. The method also includes receiving, by the DM server, from the user computing device, in response to the consent recommendation, a response indicating user consent for the requesting entity to access the at least one PII item. The method further includes transmitting, by the DM server, to the requesting entity, a notification indicating the user consent for the requesting entity to retrieve the at least one PII item from a third-party PII storage entity. The method also includes updating, in the memory device, the user profile to track the requesting entity with the at least one PII item.

In yet another aspect, at least one non-transitory computer-readable storage media that includes computer-executable instructions for tracking data protection compliance of a plurality of entities using a data management computing system is provided. The data management computing system includes a data management ("DM") server in communication with a user computing device associated with a user and a requesting entity. When executed by the DM server, the computer-executable instructions cause the DM server to store a user profile associated with the user and to store a records database. The records database includes a plurality of compliance records generated by the DM server to track interactions between the DM server and the requesting entity. When executed by the DM server, the computer-executable instructions further cause the DM server to receive, from the requesting entity, a personally identifying information ("PII") consent request for access to a requested PII set of the user. The PII consent request identifies a reason code associated with the requested PII set. When executed by the DM server, the computer-executable instructions further cause the DM server to determine, based on the PII consent request, at least one PII item associated with the reason code.

When executed by the DM server, the computer-executable instructions further cause the DM server to compare the at least one PII item to the requested PII set, and generate, based on the comparison, a consent recommendation. The consent recommendation provides a course of action regarding the at least one PII item. When executed by the DM server, the computer-executable instructions further cause the DM server to transmit the consent recommendation to the user computing device, and to receive, from the user computing device, in response to the consent recommendation, a response indicating user consent for the requesting entity to access the at least one PII item. When executed by the DM server, the computer-executable instructions further cause the DM server to transmit, to the requesting entity, a notification indicating the user consent for the requesting entity to retrieve the at least one PII item from a third-party PII storage entity. When executed by the DM server, the computer-executable instructions also cause the DM server to update the user profile to track the requesting entity with the at least one PII item.

BRIEF DESCRIPTION OF THE DRAWINGS

FIG. 1 is a simplified block diagram of an example data management (DM) computing system, in accordance with one embodiment of the present disclosure.

FIG. 2 is a data flow diagram illustrating an example flow of data for providing personally identifiable information (PII) consent to a requesting entity using the DM computing system shown in FIG. 1.

FIG. 3 is a data flow diagram illustrating an example flow of data for providing, to a requesting entity, user consent to share PII with a third party entity using the DM computing system shown in FIG. 1.

FIG. 4 is a data flow diagram illustrating an example flow of data for requesting removal of a user's PII using the DM computing system shown in FIG. 1.

FIG. 5 is a simplified block diagram of an example process for generating an entity trust score, in accordance with one embodiment of the present disclosure.

FIG. 6 is a simplified block diagram of an example process for generating a recommendation, in accordance with one embodiment of the present disclosure.

FIG. 7 is an example configuration of a data management (DM) server of the DM computing system, as shown in FIG. 1.

FIG. 8 is an example configuration of a user computing device shown in FIG. 1, in accordance with one embodiment of the present disclosure FIG. 9 is a flow diagram illustrating an example process using the DM computing system, as shown in FIG. 1.

Figure 1:
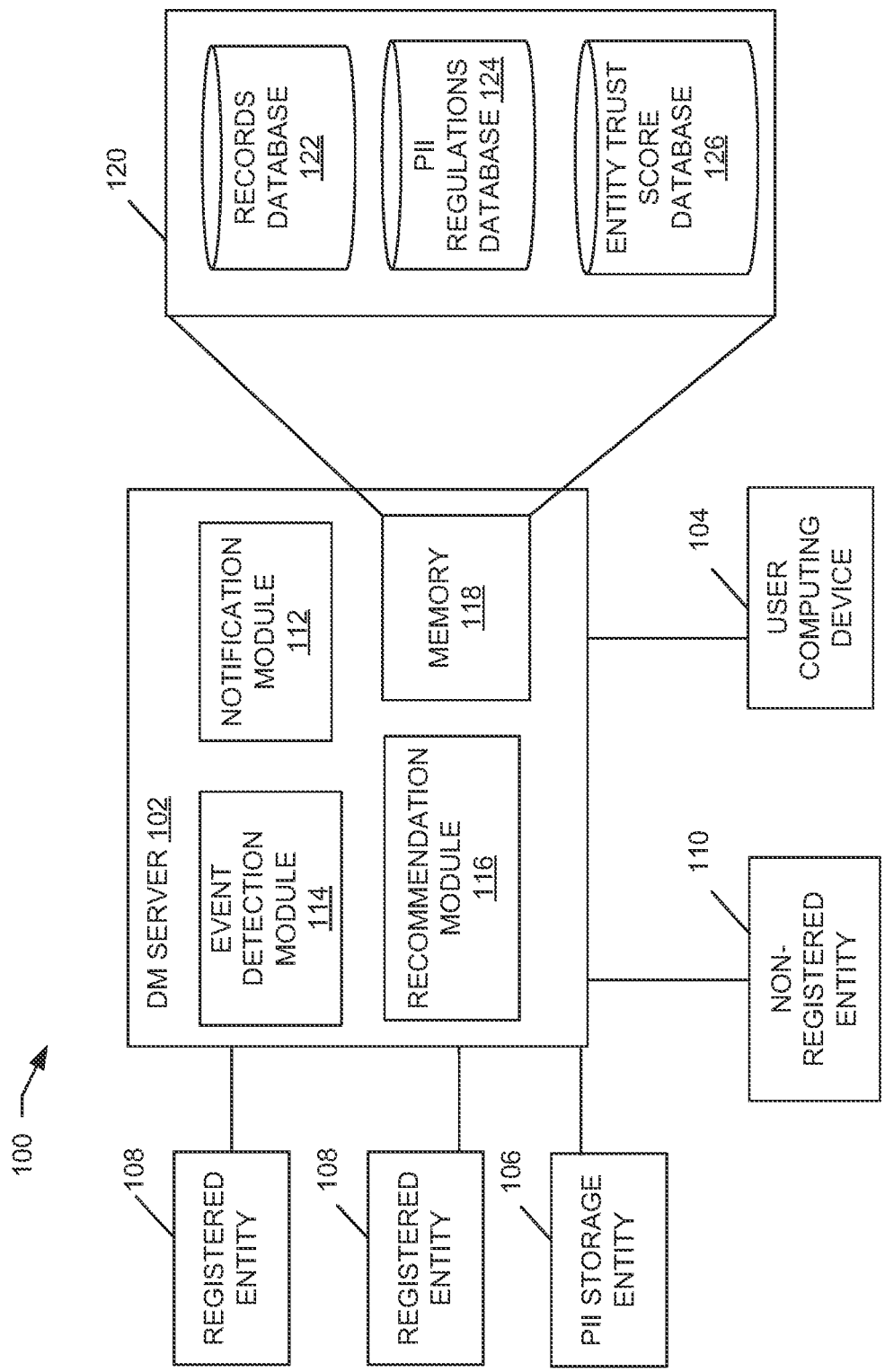
FIGS. 1-9 show example embodiments of the methods and systems described herein.

Like numbers in the Figures indicate the same or functionally similar components. Although specific features of various embodiments may be shown in some figures and not in others, this is for convenience only. Any feature of any figure may be referenced and/or claimed in combination with any feature of any other figure.

DETAILED DESCRIPTION

The systems and methods described herein are directed to tracking data protection compliance of entities that use personally identifying information (PII). A data management (DM) computing system configured to provide a DM service is described herein. The DM computing system includes a DM server in communication with a requesting entity (e.g., a registered entity, a non-registered entity), a user computing device, and/or at least one third-party PII storage entity.

The DM server enables users (e.g., consumers) to manage and control PII shared with requesting entities (e.g., registered entities and non-registered entities). More specifically, the DM server enables a user to monitor entities that have access to one or more PII items of the user. The DM server receives user PII consent requests from requesting entities and allows users to review each request, thereby facilitating a user's control over consent-based data processing. In the example embodiment, the DM server generates consent recommendations based on the consent requests, thereby enabling users to make informed decisions when deciding whether to provide consent to a requesting entity to access the user's PII.

The DM server also enables users to revoke consent by submitting a PII removal request. The PII removal request identifies one or more PII items accessed, stored, or otherwise processed by a registered entity for which the user is revoking consent. The DM server may generate compliance records associated with each registered entity. Compliance records are generated by the DM server to track each interaction between a user and a registered entity being monitored by the user. Tracked interactions include PII consent requests and PII removal requests. Compliance records may be linked to a user profile associated with a user, and stored in a records database in the memory. In the example embodiment, the DM server analyzes data from the compliance records (e.g., compliance data) to generate consent recommendations. The DM server may generate consent recommendations by parsing the records database for compliance records associated with the requesting entity to determine a characteristic compliance rate and a characteristic compliance time. Compliance data may also be used to generate an entity trust score associated with a particular entity.

In one example, the DM server may receive a PII removal request from a user requesting removal of the user's PII items from a lender after the user's loan repayment plan with the lender has ended. In this example, the DM server is configured to notify the lender and track the lender's compliance with respect to the user's request. The DM server may receive a removal compliance response from the registered entity, notifying the DM server that the requested PII items have been removed. The DM server monitors the lender to determine whether the lender complies with the removal request. The DM server may also monitor the lender to determine how long it takes for the lender to remove the user's PII (e.g., characteristic compliance time) and/or to calculate the lender's response rate (e.g., average response time, characteristic compliance rate). The data collected by the DM server while monitoring the lender for compliance (e.g., compliance data) is used by the DM server to generate consent recommendations as well as the lender's entity trust score.

The DM server is also configured to detect triggering events associated with a registered user and/or a registered entity. Triggering events include security events, such as data breaches and/or security incidents (e.g. identity theft, malware attack). Triggering events may be related to a user's payment card information. For example, triggering events may include lost or stolen credit card numbers and fraudulent transaction activity associated with a user's payment card information. In other embodiments, triggering events may include user-initiated life events provided to the DM server, such as marriage, divorce, or death. In the example embodiment, in response to a detected triggering event, the DM server immediately notifies the affected parties (e.g., the user, registered entities that are monitored by the user, third-party PII storage entity).

In the example embodiment, an individual user registers (e.g., signs up) with the DM service using the user's user computing device. The user may access the DM service via a DM application. For example, the DM application is a dedicated application installed on the user computing device and configured to communicate with a host application on the DM server. In another example, the DM application is a web browser installed on the user computing device and in communication with a website hosted by the DM server. Once the user accesses the DM service, the user may register for the service by inputting registration data. Additionally or alternatively, the user may establish user consent preferences during registration. In certain embodiments, the user may pre-authorize a level of consent (a "subscription level") for a specific category of entities. For example, during registration, the user may choose to provide express consent to sharing childhood immunization records with an educational entity, such as a university, that is requesting the records for school enrollment purposes.

In the example embodiment, an entity may automatically register with the DM service the first time the entity submits a PII consent request to the DM server. When the DM server receives the PII consent request, the DM server may verify (e.g., check) that the PII consent request is from the entity using any suitable verification method to avoid potentially compromising the user's PII. Additionally or alternatively, the DM server verifies details regarding the ownership and/or set-up of the entity to determine the legitimacy of the entity requesting the user's PII. For example, the DM server may determine the amount of time an entity has been in operation. In an alternative embodiment, an entity may pre-register with the DM service before the entity ever submits a PII consent request to the DM server.

In the example embodiment, the DM server actively monitors registered entities on a regular basis to determine whether each registered entity complies with data privacy regulations and standards. For each registered entity, the DM server may receive information, such as, for example, the type of user PII stored at a registered entity, the length of time each PII item has been stored at a registered entity, whether express user consent to access, store, and/or process each of the user's PII was obtained by the registered entity, and/or whether the registered entity has shared the user's PII with another entity.

The term "entity," as used herein, refers generally to an organization that actively gathers, processes, and/or otherwise uses PII. The term "requesting entity," as used herein, refers to entities that request access to one or more PII items. Requesting entities may include, but are not limited to, entities that are registered with the DM server. In some embodiments, unregistered requesting entities may automatically become registered with the DM server the first time the requesting entity submits a consent request. Examples of requesting entities include merchants, internet service providers, social networking services, education institutions, payment processing networks, payment processors, financial institutions (e.g., issuers, acquirers), lenders, healthcare providers, insurance companies, and the like.

The term "personally identifying information (PII)," as used herein, refers generally to personal data that can potentially be used to directly or indirectly identify a person. PII includes, for example, an individual's full name, social security number, driver's license number, bank account number, passport number, taxpayer identification number, patient identification number, medical records, credit card number, personal address information (e.g., street address, email address, phone number), biometric data (e.g., fingerprints, voice samples), and Internet Protocol (IP) or Media Access Control (MAC) addresses linked to an individual.

The technical effects achieved by the systems and methods described herein include enabling entities that process PII items to comply with complex data privacy regulations and standards and improve PII management by tracking user consent for requested PII items. The technical effects also include (i) enabling consumers to better safeguard and control PII shared with entities and between entities by automatically tracking not only the consumer consent provided for each PII item requested, but also the withdrawals of consent for each PII item, (ii) reducing unnecessary data oversharing by providing consumers with customized recommendations for each user consent request received from an entity (e.g., the recommendations identify the minimum amount of PII needed for a reason code and/or whether a consumer should trust an entity with their PII), (iii) reducing unnecessary PII stored by entities by enabling consumers to not only view all the PII items accessed by a particular entity, but by also allowing consumers to easily submit requests to remove PII items, and (iv) in the event of a security incident and/or data breach, minimizing data compromise with respect to a consumer's PII.

The DM server described herein enables users to easily monitor those entities that have access to the user's PII items—both stale (e.g., outdated) and current PII items. A user may perform an on-demand lookup, from their user computing device, of entities that are accessing and/or currently storing the user's PII items. The user may access information about these entities (e.g., entity name, type, description) as well as the individual PII items accessed by these entities. For example, the DM server may detect that a lender is storing a user's banking information and contact information. In this example, the user may determine that a loan associated with this lender was paid off years ago, and that the PII items should no longer be stored by the lender. The DM server enables the user to submit a request to the lender, requesting removal of the PII items. Thus, the DM server enables users to directly monitor and control which entities have access to their PII items. The DM computing system described herein is configured to transmit PII consent requests and PII removal requests to consumers and registered entities in real time (or near real time). In further embodiments, the user may perform an on-demand lookup, from their user computing device, to access information regarding entities that previously requested the user's PII items but were declined by the user.

The methods and systems directed to the data management computing system described herein may be implemented using computer programming or engineering techniques including computer software, firmware, hardware or any combination or subset thereof, wherein the technical effect may be achieved by performing at least one of the following steps: (a) receiving, from a requesting entity, a PII consent request for access to a requested PII set of the user, the PII consent request identifying a reason code associated with the requested PII set, (b) determining, by the DM server, based on the PII consent request, at least one PII item associated with the reason code, (c) comparing, by the DM server, the at least one PII item to the requested PII set, (d) generating, by the DM server, based on the comparison, a consent recommendation, wherein the consent recommendation provides a course of action regarding the at least one PII item, (e) transmitting the consent recommendation to the user computing device, (f) receiving, from the user computing device, in response to the consent recommendation, a response indicating user consent for the requesting entity to access the at least one PII item, (g) transmitting, to the requesting entity, a notification indicating the user consent for the requesting entity to retrieve the at least one required item of PII from a third-party PII storage entity, and (h) updating a user profile to track the requesting entity with the at least one PII item.

In one embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality.

The following detailed description illustrates embodiments of the disclosure by way of example and not by way of limitation. It is contemplated that the disclosure has general application to providing a data management (DM) computing system for tracking data protection compliance of entities that use PII, and for providing users with an option to consent to individual requests for user PII for various data processing activities.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 depicts a simplified block diagram of an example data management (DM) computing system 100 for directly tracking data protection compliance of entities that use PII. DM computing system 100 includes a DM server 102 in communication with at least one user computing device 104, at least one PII storage entity 106, and one or more entities including registered entities 108 and non-registered entities 110. Registered entities (e.g., subscribed entities) 108 refer to entities that are registered with DM server 102. More specifically, registered entities 108 are entities that are actively monitored by DM server 102 on behalf of a user for data protection compliance. Non-registered entities (e.g., non-subscribed entities) 110 refers to entities that are not registered for the DM service with DM server 102.

DM server 102 includes a notification module 112, an event detection module 114, a recommendation module 116, and a memory 118. Memory 118 may include a plurality of databases 120, such as, a records database 122, a PII regulations database 124, and an entity trust score database 126. Additionally or alternatively, memory 118 may include a database server (not shown). In an alternative embodiment, databases 120 may be stored remotely from DM server 102 and may be non-centralized.

In the example embodiment, an individual (e.g., a user) may register (e.g., sign up) with the DM service via a network (e.g., Internet network) using user computing device 104. The individual may access the DM service via a DM application. Once the individual accesses the DM service, the individual may register for the service by inputting registration data. For example, during registration, an individual may provide contact information (e.g., an email address and/or a phone number) so as to enable DM server 102 to provide recommendations and notify the user of triggering events associated with entities, such as a data security incident (e.g., identity theft, data breach). In some embodiments, the user may establish user consent preferences during registration. In these embodiments, the user may pre-authorize a level of consent (a "subscription level") for a specific category of entities. For example, during registration, the user may choose to provide express consent to sharing childhood immunization records with an educational entity, such as a university, that is requesting the records for school enrollment purposes.

In the example embodiment, an entity may automatically register with the DM service the first time the entity submits a PII consent request (PII consent request 252, shown in FIG. 2) to DM server 102. When DM server 102 receives the PII consent request, DM server 102 may verify (e.g., check) that the PII consent request is from the entity using any suitable verification method, such as using Public Key Infrastructure to verify that the request was signed using the requesting entity's private key, to avoid potentially compromising the user's PII. Additionally or alternatively, DM server 102 verifies details regarding the ownership and/or set-up of the entity to determine the legitimacy of the entity requesting the user's PII. For example, DM server 102 may determine how long an entity has been in operation. In an alternative embodiment, an entity may pre-register with the DM service before the entity ever submits a PII consent request to DM server 102.

In the example embodiment, DM server 102 receives PII consent requests to access a user's PII from one or more registered entities 108. Registered entities 108 submit a PII consent request to DM server 102 to obtain express user consent each time registered entities 108 want to access a user's PII (for which user consent is not yet provided) and/or share the user' PII with a third party entity. Additionally or alternatively, DM server 102 receives PII consent requests from one or more non-registered entities 110. For example, a user may direct non-registered entity 110 to obtain user consent through DM server 102. Thus, the term "requesting entities" 202 (shown in FIG. 2), as used herein, includes both registered entities 108 and non-registered entities 110 that request user consent to access a user's PII. In some embodiments, non-registered entities 110 that submit a PII consent request to DM server 102 can automatically become registered entities 108 upon submitting a PII consent request.

More specifically, DM server 102 generates user profiles for each user registered with DM server 102. User profiles may include information regarding which of the user's PII items have been accessed by each requesting entity 202, e.g., for one or more registered entities 108 that have requested access to PII of the individual user. User profiles may include further information regarding each requesting entity 202 being monitored by an individual user, such as the status of each user consent request (e.g., user consent granted or denied). In certain embodiments, user profiles may include contact information provided by a user during registration (e.g., email address, phone number, and home address). User profiles are stored in records database 122 and may periodically be updated to include the most current information available for each registered entity 108.

In the example embodiment, a user's PII is not stored at DM server 102. When a user grants a requesting entity permission to access the user's PII, the requesting entity may retrieve the PII from PII storage entity 106. PII storage entity 106 is a third party entity, such as a credit bureau. In some embodiments, DM server 102 notifies PII storage entity 106 that a user has consented to sharing specific PII items with a requesting entity, and instructs PII storage entity 106 to divulge only the specific PII items the user has consented to. For example, DM server 102 may instruct PII storage entity 106 to restrict a requesting entity's access to certain information in a user's credit report.

In the example embodiment, compliance criteria (e.g., governmental and/or industry-specific compliance rules or standards) based on guidelines and regulations regarding the safeguarding and handling of PII are stored in PII regulations database 124. Additionally or alternatively, compliance rules may also be based on user preferences provided during registration. For example, during registration, an individual user may establish parameters stating that in the event any registered entity 108 having access to one or more PII items of the user experiences a data breach, the user automatically revokes consent.

In the example embodiment, PII regulations database 124 may include compliance rules based on data privacy, security, and/or data breach regulations and procedures applicable to a variety of different entities, such as hospitals, businesses, and educational institutions. DM server 102 may store compliance rules based on regulations for one or more countries and/or territories, such as, for example, the European Union's General Data Protection Regulation (GDPR), United States (U.S.) federal privacy laws, and/or U.S. state privacy laws, such as the California Consumer Privacy Act (CCPA). In further embodiments, DM server 102 is configured to periodically update the compliance rules stored in PII regulation database 124 to reflect changes to regulations and procedures on which the compliance rules are based.

In the example embodiment, entity trust score database 126 includes trust scores computed for each registered entity 108. In some embodiments, entity trust score database 126 includes trust scores for non-registered entities 110. DM server 102 is configured to periodically update trust scores in entity trust score database 126. Entity trust score database 126 may also include information used by DM server 102 to compute the trust scores, as described in detail below with respect to FIG. 5. This information may be continuously updated to enable DM server 102 to output entity trust scores as accurately as possible.

In the example embodiment, DM server 102 utilizes event detection module 114 to detect security incidents and/or events associated with registered entities 108 that require immediate alert to affected users. For example, by analyzing information received from one or more registered entities 108 and one or more PII storage entities 106, DM server 102 may detect that a security incident has occurred with a particular registered entity 108 and/or a particular user. In other embodiments, DM server 102 may be notified by registered entity 108 of a security incident and/or a data breach. In the example embodiment, DM server 102 is configured to notify affected users of security incidents and/or events by using notification module 112. Notification module 112 may be configured to look up a user's contact information in memory 118 and transmit an alert message to the user. For example, notification module 112 may look up a user's contact information in the user's profile in records database 122. Security events that trigger an alert message may include, but are not limited to, identity theft, data breaches, cyberattacks, malware infections, loss or theft of equipment, and/or impermissible use or disclosure of PII associated with one or more registered entities 108.

In the example embodiment, DM server 102 utilizes recommendation module 116 to generate recommendations for users in response to receiving PII consent requests from requesting entities. More specifically, when DM server 102 receives a PII consent request from a requesting entity, DM server 102 utilizes recommendation module 116 to generate a recommendation as to whether a user should grant permission for the requesting entity to access and store requested PII items. DM server 102 utilizes notification module 112 to transmit the generated recommendation to a user.

Figure 2:
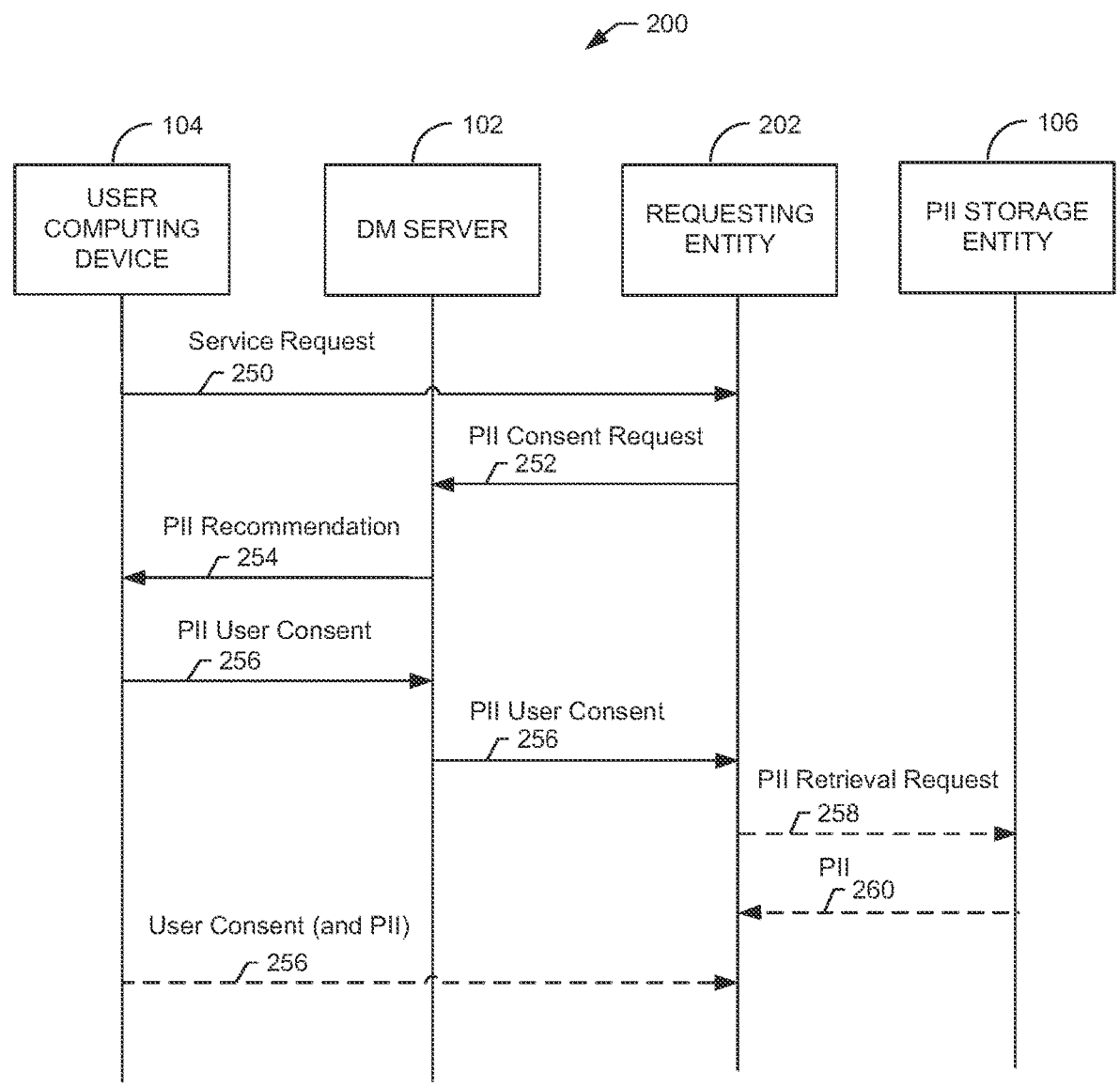

FIG. 2 depicts a data flow diagram 200 illustrating an example flow of data for providing user consent to a requesting entity 202 using DM computing system 100 (shown in FIG. 1). As described above, with respect to FIG. 1, requesting entity 202 can refer to registered entity 108 and/or non-registered entity 110 (shown in FIG. 1). In the example embodiment, user computing device 104 transmits a service request 250 to requesting entity 202. Service request 250 may represent a request in which a user is attempting to sign up for, enroll in, apply for, register with, opt into, purchase, and/or otherwise associate with a service and/or good provided by requesting entity 202. In other words, service request 250 refers to requests made by a user to requesting entity 202, which can cause an entity, such as requesting entity 202, to request, access, collect, and/or store the user's PII. Examples of service requests 250 include, but are not limited to, a user applying for a loan, applying for a job, opening a checking account, purchasing airline tickets, making hotel and/or rental car reservations, purchasing goods from an online merchant, and/or downloading software applications for use on user computing device 104.

In the example embodiment, in response to requesting entity 202 receiving service request 250, requesting entity 202 transmits a PII consent request 252 to DM server 102. PII consent request 252 is a request to access one or more items of a user's PII. PII consent request 252 may also include user permission to store the one or more PII items at requesting entity 202. DM server 102 enables requesting entities 202 to actively seek user permission to access, store, and share a user's PII. In the example embodiment, users of the DM service do not provide broad consent or blanket consent to requesting entities 202. Rather, DM server 102 enables users to provide permission with regards to not only access and storage of requested PII, but also permission for specific uses of the requested PII. PII consent request 252 may include a reason for the requested PII and specific activities that requesting entity 202 intends to carry out with the user's PII. In some embodiments, PII consent request 252 includes specific PII items requested by requesting entity 202, such as, for example, a user's social security number or driver's license number. In other embodiments, PII consent request 252 may include a general request to access a category of PII, such as, for example, hospital records, immunization records, employment records, and/or financial records.

In the example embodiment, in response to receiving PII consent request 252, DM server 102 generates a PII recommendation 254, and transmits PII recommendation 254 to user computing device 104. As described below in detail, with respect to FIG. 6, PII recommendation 254 informs a user of the received PII consent request 252, and provides a recommendation as to whether or not to provide express consent. More specifically, PII recommendation 254 delineates one or more PII items, reasons for use, and consent duration recommended by DM server 102 in response to the information provided by requesting entity 202 in PII consent request 252. For example, requesting entity 202 may be a lender that submits a PII consent request 252 in response to a user applying for a home mortgage loan with the lender. In this example, PII consent request 252 may include documents and/or specific PII items the lender is requesting to assess the user's ability to repay his or her loans. PII consent request 252 may ask for user consent to access and store the user's tax returns, pay stubs, bank statements, credit report, and/or photo identification (e.g., driver's license). In response, DM server 102 may recommend that the user only provide consent for requesting entity 202 to access and store the requested information for a limited period of time (e.g., 3 months) and/or until a user specified event occurs (e.g., the loan application is either approved or denied).

In the example embodiment, in response to transmitting PII recommendation 254 to user computing device 104, DM server 102 receives user consent 256 from the user. A user may provide consent for requesting entity 202 to access some or all of the requested PII. In some embodiments, a user may provide consent for a limited period of time. Consent provided may be limited to one or more specific purposes. In the example embodiment, DM server 102 transmits user consent 256 to requesting entity 202. In response to receiving user consent 256, requesting entity 202 transmits a PII retrieval request 258 to PII storage entity 106 to obtain the user's PII. PII retrieval request 258 can include a confirmation of user consent 256 and a list of one or more PII items for retrieval. PII retrieval request 258 may also indicate that requesting entity 202 received user consent to access the requested PII. In response to PII retrieval request 258, requesting entity 202 may receive the requested PII 260 from PII storage entity 106. Alternatively, the user provides both user consent 256 and PII directly to requesting entity 202.

In the example embodiment, requesting entity 202 submits PII consent request 252 each time requesting entity 202 wants to use a user's PII for a purpose or activity different from the original purpose for which user consent was provided. For example, requesting entity 202 may receive permission from a user to acquire and store the user's home address, email address, and phone number for the sole purpose of notifying the user for billing purposes. In this example, if requesting entity 202 wants to send advertising and marketing material to the user using the user's home address, email address, and/or phone number, requesting entity 202 submits a separate request to DM server 102 to obtain user consent for this specific purpose.

Figure 3:
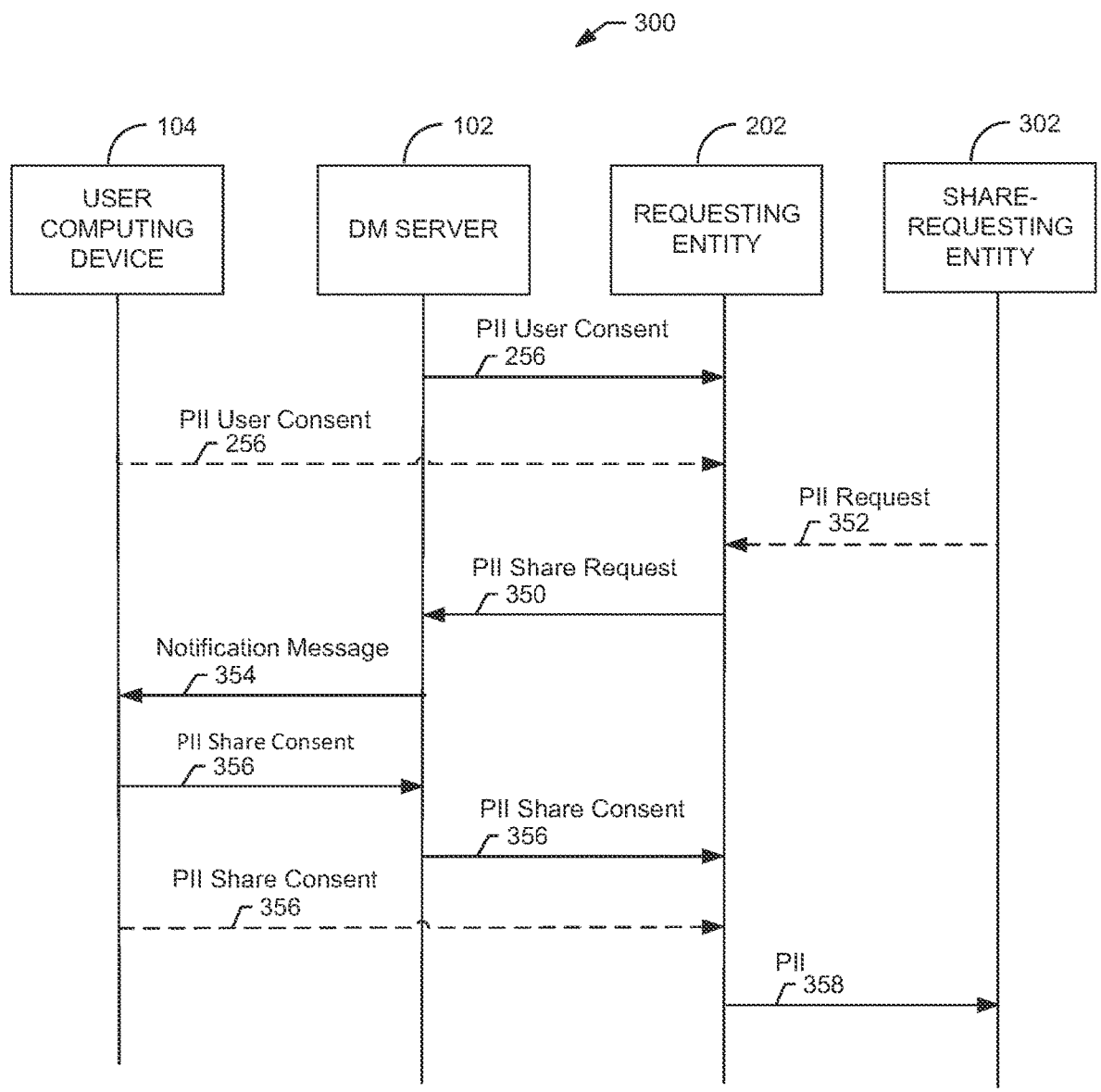

FIG. 3 depicts a data flow diagram 300 illustrating an example flow of data for providing, to requesting entity 202, user consent to share PII with a share-requesting entity 302 using DM computing system 100 (shown in FIG. 1). As described above, with respect to FIG. 2, a user provides PII user consent 256 to requesting entity 202 using DM server 102. DM server 102 transmits PII user consent 256 of the user to requesting entity 202 to enable requesting entity 202 to access the user's PII from PII storage entity 106 (shown in FIG. 1). Alternatively, the user directly provides PII user consent 256 and the requested PII to requesting entity 202.

In the example embodiment, DM server 102 receives a PII share request 350 from requesting entity 202 to share PII stored at requesting entity 202 with a share-requesting entity 302. For example, requesting entity 202 may want to sell a user's PII to share-requesting entity 302. In some embodiments, share-requesting entity 302 transmits a PII request 352 to requesting entity 202, requesting that requesting entity 202 share one or more items of a user's PII. In response, requesting entity 202 submits PII share request 350 to DM server 102. PII request 352 may include a request for PII to be obtained by requesting entity 202 requesting and receiving PII user consent 256 from a user. Additionally or alternatively, PII request 352 may include a request for PII previously collected by and stored at requesting entity 202. For example, share-requesting entity 302 may be a lender and requesting entity 202 may be a bank when the user has a savings account. In this example, the lender may transmit a PII request 352 to the bank, requesting financial documents associated with a user's bank account to complete the user's loan application process with the lender.

In the example embodiment, in response to DM server 102 receiving PII share request 350 from requesting entity 202, DM server 102 notifies the user by transmitting a notification message 354 to user computing device 104. In some embodiments, notification message 354 may include a recommendation similar to PII recommendation 254 (shown in FIG. 2). For example, notification message 354 may include a recommendation generated by DM server 102 as to whether or not the user should provide consent to PII share request 350 from requesting entity 202. In the example embodiment, notification message 354 prompts the user to either affirmatively grant or refuse consent in response to PII share request 350. If the user does not consent to requesting entity 202 sharing the user's PII with share-requesting entity 302, DM server 102 notifies requesting entity 202 of the user's refusal to consent (not shown).

In the example embodiment, DM server 102 receives PII share consent 356 from user computing device 104. PII share consent 356 provides express user consent to requesting entity 202, thereby permitting requesting entity 202 to share the requested PII items with share-requesting entity 302. Similar to PII user consent 256 (shown in FIG. 2), PII share consent 356 may include user consent to share one or more of the requested PII items. PII share consent 356 may also set conditions or parameters regarding the user consent. For example, the user may provide consent for a specific purpose (e.g., loan application process) and/or a limited duration of time (e.g., 3 months from the date of providing user consent). PII share consent 356 may include a user request to remove the user's PII from share-requesting entity's 302 database(s) after a designated period of time (e.g., 3 months).

In the example embodiment, DM server 102 provides PII share consent 356 to requesting entity 202. Alternatively, a user may directly provide PII share consent 356 to requesting entity. In response, requesting entity 202 shares the requested PII 358 with share-requesting entity 302. In the example embodiment, DM server 102 automatically registers share-requesting entity 302 after the user provides PII share consent 356. Thus, share-requesting entity 302 becomes one of registered entities 108. As share-requesting entity 302 now has access to one or more items of the user's PII, DM server 102 actively monitors share-requesting entity 302 for data protection compliance on behalf of the user. DM server 102 may add share-requesting entity 302 to a list of registered entities 108 that are being monitored by DM server 102 on behalf of the user. For example, DM server 102 may update the user's profile in records database 122 to include share-requesting entity 302.

Additionally or alternatively, in some embodiments, in response to receiving PII share consent 356 from a user, DM server 102 generates and transmits a token (not shown) to share-requesting entity 302. In these embodiments, share-requesting entity 302 submits the token to requesting entity 202. In response to receiving the token, requesting entity 202 provides requested PII 358 to share-requesting entity 302. In further embodiments, DM server 102 may receive a notification (not shown) from requesting entity 202 after requesting entity 202 provides the requested PII 358 to share-requesting entity 302. In these embodiments, DM server 102 may store the notification in, for example, records database 122 (FIG. 1) for recordkeeping purposes.

Figure 4:
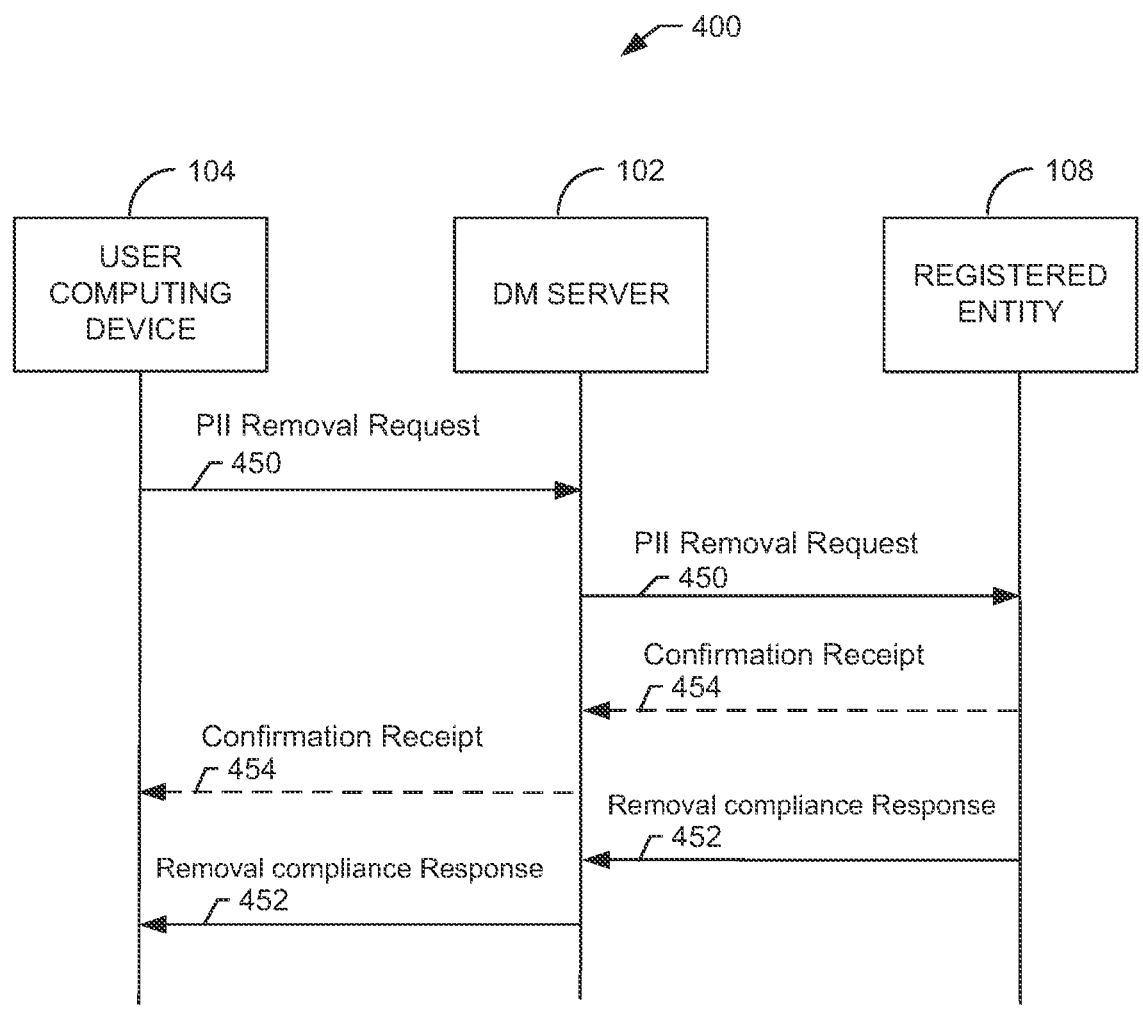

FIG. 4 depicts a data flow diagram 400 illustrating an example flow of data for requesting removal of a user's PII using DM computing system 100 (shown in FIG. 1). In the example embodiment, a user revokes PII privileges from one or more registered entities 108 by submitting a PII removal request 450 to DM server 102. The user submits PII removal request 450 to DM server 102 using, for example, the DM application in user computing device 104. In some embodiments, the DM application may display a "removal request" option next to each registered entity 108 being monitored by the user. Additionally or alternatively, a "removal request" option may be displayed next to each item of PII used and/or stored by a particular registered entity 108. In these embodiments, the user may press the "removal request" option to transmit PII removal request 450 for one or more PII items for which the user would like to revoke consent.

In the example embodiment, DM server 102 transmits the PII removal request 450 to requesting entity 202. DM server 102 may look up one or more applicable PII compliance standards from PII regulation database 124 based on a country and/or state in which the user resides. For example, DM server 102 may determine that requesting entity 202 is collecting and storing PII for a user in Europe. In this example, based on this information, DM server 102 may determine that specific provisions from the GDPR govern requesting entity 202 with respect to PII removal request 450. In some embodiments, DM server 102 may provide additional information in the PII removal request 450, instructing requesting entity 202 that compliance is strongly encouraged or required under an applicable law or regulation. For example, DM server 102 may include information in PII removal request 450 stating that requesting entity 202 needs to comply within a specific number of days in accordance with an applicable law, regulation, and/or standard.

In the example embodiment, in response to PII removal request 450, DM server 102 receives a removal compliance response 452 from requesting entity 202. Removal compliance response 452 notifies DM server 102 that requesting entity 202 has removed any links to or copies of the PII identified in PII removal request 450. Additionally or alternatively, in response to PII removal request 450, DM server 102 may receive a confirmation receipt 454 from registered entity 108. Confirmation receipt 454 may provide acknowledgment, confirming receipt of PII removal request 450 from DM server 102. Confirmation receipt 454 may further provide a removal time frame. For example, confirmation receipt 454 may state that the requested PII items will be removed from requesting entity's 202 databases, within 30 days. Confirmation receipt 454 may also provide an explanation for the removal time frame. For example, confirmation receipt 454 may state a removal time frame of up to 50 days due to the complexity of the request (e.g., locating and removing multiple PII items). In these embodiments, DM server 102 transmits confirmation receipt 454 to user computing device 104. When requesting entity 202 complies with PII removal request 450, DM server 102 receives removal compliance response 452 from requesting entity 202.

In the example embodiment, DM server 102 transmits removal compliance response 452 to user computing device 104 to notify the user of the completed PII removal request 450. DM server 102 further updates the user's profile in records database 122 to reflect the change.

Figure 5:
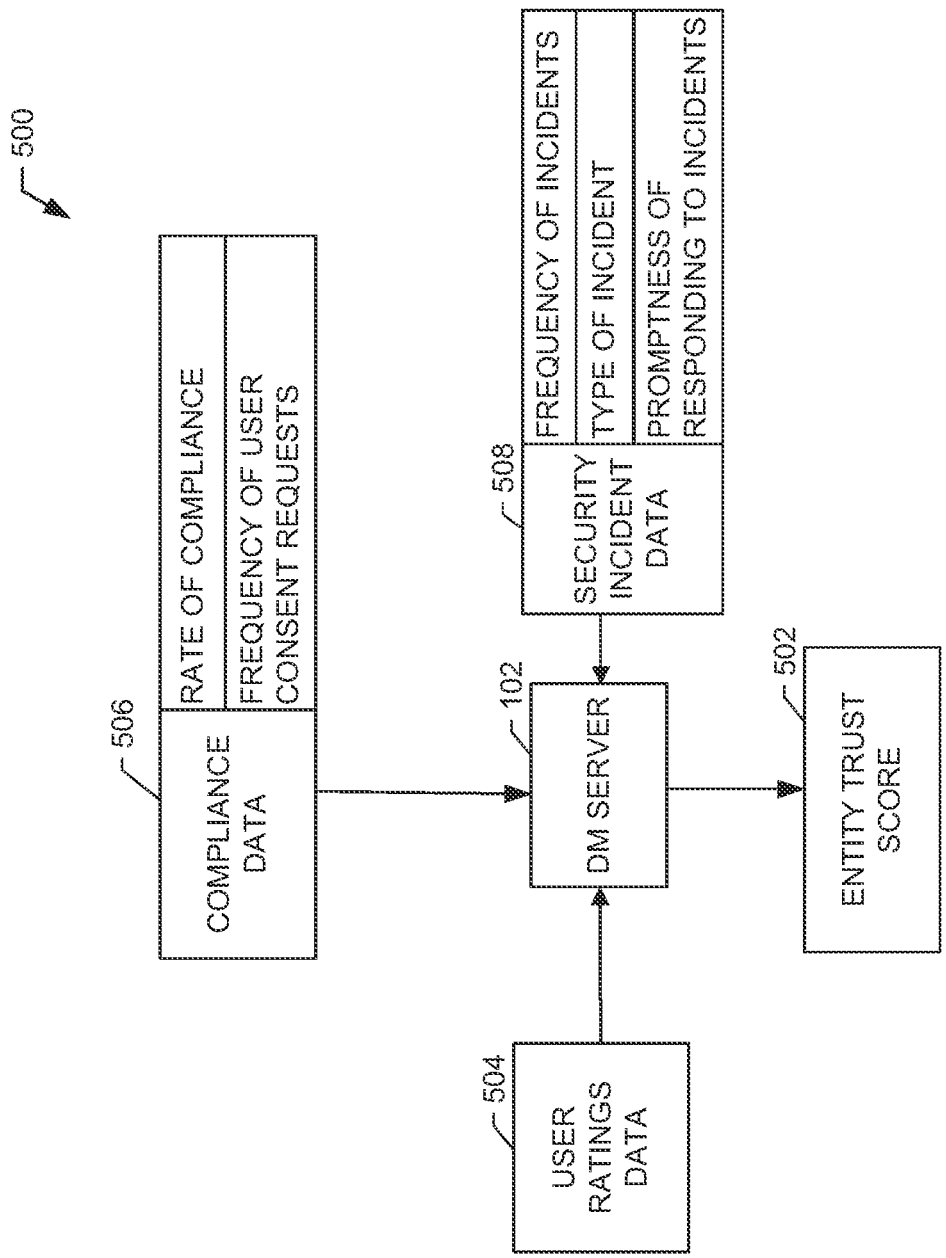

FIG. 5 depicts a simplified block diagram 500 of an example process for generating an entity trust score 502 using DM system 100 (shown in FIG. 1). As shown in FIG. 5, diagram 500 includes DM server 102, user ratings data 504, compliance data 506, and security incident data 508. In the example embodiment, DM server 102 is configured to generate entity trust score 502 for each registered entity 108 based on data 504, 506, and 508. Entity trust scores 502 are calculated by DM server 102 to evaluate whether registered entities 108 should be trusted by users to securely handle PII and to evaluate how well registered entities 108 comply with applicable PII security requirements, regulations, and protocols associated with, for example, the collection, storage, processing, and/or dissemination of user PII.

User ratings data 504 includes entity ratings provided by users of the DM service. In the example embodiment, DM server 102 enables users to rate each registered entity 108 that a user monitors using the DM service. User ratings data 504 is based on user perception of how each registered entity 108 handles user PII and therefore may be at least partially subjective. In other words, user ratings data 504 is based on user satisfaction regarding each user's experience with the collecting, storage, and/or dissemination of PII by registered entity 108. For example, user ratings may be based on factors such as response times to PII removal requests 450 and the frequency of user consent requests, such as PII consent requests 252 (shown in FIG. 2) and PII share requests 350 (shown in FIG. 3).

In some embodiments, DM server 102 generates user surveys for users to fill out after a user interacts with registered entity 108, such as after a PII consent request 252, PII share request 350, and/or PII removal request 450. In these embodiments, DM server 102 may ask users to rate their experience with registered entity 108 on a scale ranging from good to bad. In other embodiments, DM server 102 periodically prompts a user via, for example, the DM application and/or email, to provide feedback as well as updated feedback with respect to registered entity 108.

Compliance data 506 includes data gathered by DM server 102 with respect to registered entities 108. More specifically, compliance data 506 includes the data tracked by DM server 102 with respect to FIGS. 2-4. In the example embodiment, DM server 102 directly tracks PII security compliance of each registered entity 108. Accordingly, compliance data 506 includes objective data regarding the responsiveness of registered entities 108 with respect to PII removal requests 450 (e.g., the frequency of confirmation receipts 454 and removal compliance responses 452, both shown in FIG. 4), the frequency of user consent requests (e.g., PII consent requests 252, PII share requests 350), and/or the rate of compliance with respect to a user's refusal to consent (e.g., how often does a requesting entity try to access or share a user's PII after DM server 102 has communicated a user's refusal to the requesting entity). For example, DM server 102 may determine by analyzing data tracked with regards to PII removal requests 450 (shown in FIG. 4) that a particular registered entity 108 is non-responsive to PII removal requests 450 over 50 percent of the time. In another example, DM server 102 may determine that a particular registered entity 108 shares PII with a share-requesting entity 302 (shown in FIG. 3) 20 percent of the time even after DM server 102 notifies registered entity 108 of a user's express refusal of consent.

In the example embodiment, compliance data 506 further includes the average response time for each request submitted by DM server 102 to registered entity 108 on behalf of a user. For example, DM server 102 is configured to track the average response time for each PII removal request 450. DM server 102 may submit requests for follow up information to registered entity 108 regarding PII consent requests 252 and PII share requests 350. For example, DM server 102 may ask registered entity 108 to provide additional information regarding each intended use of the requested PII. In these embodiments, DM server 102 may track the average response time for each request for follow up information. In other embodiments, compliance data 506 includes the resolution rates calculated by DM server 102 regarding the average rate at which each registered entity 108 complies with PII removal requests 450.

In the example embodiment, compliance data 506 further includes compliance trend data (not shown) for each registered entity 108. More specifically, DM server 102 is configured to analyze compliance data 506 over various time frames to detect a compliance trend associated with each registered entity 108. For example, DM server 102 may detect from compliance trend data that a particular registered entity 108 is responding to PII removal requests 450 at nearly double the rate it did for an earlier time frame. In this example, DM server 102 may factor this upward compliance trend into registered entity's 108 entity trust score 502. In the example embodiment, DM server 102 is configured to periodically update entity trust scores 502 so as to provide scores that are as accurate as possible.

Security incident data 508 includes data regarding security incidents for each registered entity 108. Security incident data 508 includes information including the frequency of security incidents and the type of security incident involved. For example, the security incident can be a malware attack, a privacy incident, such as mishandling PII documents or inadvertent disclosure of PII, or a data breach. Security incident data 508 includes information regarding the frequency of security incidents, including the frequency and magnitude of each type of security incident that has occurred to registered entity 108. Security incident data 508 also includes, where available, information regarding the steps taken by registered entity 108 to respond to each security incident. DM server 102 is configured to analyze security incident data 508 to determine whether registered entity 108 guards against and responds to security incidents in a manner that complies with applicable PII regulations and standards.

Security incident data 508 includes information regarding whether registered entity 108 responds to security incidents in a prompt and effective manner. Security incident data 508 also includes data as to whether registered entity 108 promptly reported security incidents, such as data breaches to its customers. Security incident data 508 also includes information regarding the security measures and procedures in place by registered entity 108 to address security threats and/or incidents.

In the example embodiment, DM server 102 utilizes the above-described datasets to calculate entity trust score 502 for each registered entity 108. Each of the above-described datasets is periodically updated with data recently collected by DM server 102. Thus, DM server 102 is configured to modify entity trust scores 502 to reflect more accurate information as it becomes available. Entity trust scores 502 may be provided to one or more users of DM server 102. In the example embodiment, DM server 102 provides entity trust scores 502 to users to enable users to make informed decisions when considering whether or not to provide user consent to requesting entities 202. In some embodiments, DM server 102 is configured to provide an entity search function to users via the DM application. In these embodiments, users may search for registered entities 108, and view entity trust scores 502. DM server 102 may also use entity trust scores 502 to generate recommendations to users. For example, DM server 102 may detect that a certain registered entity's 108 entity trust score 502 has been low for over the past year. In this example, DM server 102 may recommend for a user to not enter into a PII consent relationship (e.g., deny user consent to access and/or share PII) with this particular registered entity 108.

Figure 6:
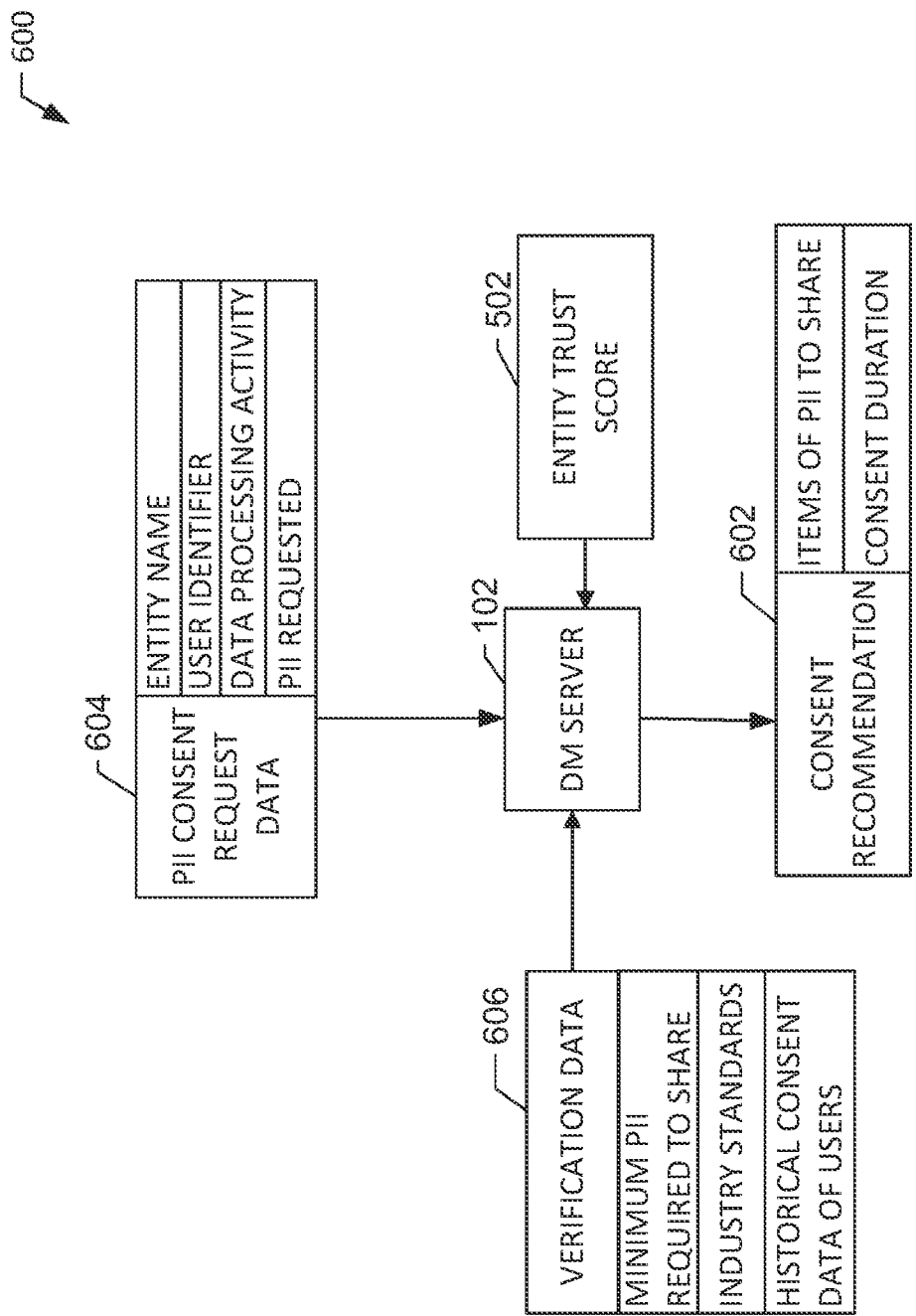

FIG. 6 depicts a simplified block diagram 600 of an example process for generating a consent recommendation 602 using DM system 100 (shown in FIG. 1). As shown in FIG. 6, diagram 600 includes DM server 102, PII consent request data 604, verification data 606, and entity trust score 502 (shown in FIG. 5). In the example embodiment, DM server 102 is configured to generate consent recommendations 602 for users in response to receiving user consent requests from requesting entities 202 (shown in FIG. 2), such as PII consent requests 252 (shown in FIG. 2) and PII share requests 350 (shown in FIG. 3). Consent recommendations 602 are generated by DM server 102 to assist users in making informed decisions when deciding whether or not to provide consent for each user consent request submitted requesting entities 202.

PII consent request data 604 includes data provided by requesting entity 202 in a user consent request, such as PII consent request 252 and PII share request 350. More specifically, PII consent request data 604 includes an entity name associated with requesting entity 202 and, if applicable, share-requesting entity 302, a user identifier associated with the user, one or more PII item identifiers for which consent is requested, and one or more reason codes regarding data processing activities (e.g., intended uses of the requested PII) for which consent is requested. PII consent request data 604 may also include response data obtained by DM server 102 from requesting entity 202 in response to requests for follow up information by DM server 102.

Verification data 606 includes data collected by DM server 102 in response to PII consent request data 604 provided by requesting entity 202. In response to receiving a user consent request, such as PII consent request 252 and PII share request 350, DM server 102 verifies each item of information provided in the user consent request. For example, DM server 102 may verify the entity name and/or the user identifier provided in the user consent request. In the example embodiment, to prevent the user from oversharing his or her PII, DM server 102 verifies each data processing activity provided in the user consent request to determine whether the requested PII is relevant to the intended purpose of use.

DM server 102 may store a table of reason codes and PII items associated with each reason code in memory 118 (shown in FIG. 1). Using the reason code provided by requesting entity 202, DM server 102 may perform a look up in the table to identify the one or more PII items that are required for the reason code. Subsequently DM server 102 may compare the identified PII items from the table with the requested PII items from requesting entity 202 to determine if the requested PII items are in excess of what is required for the provided reason code. Thus, verification data 606 includes data regarding the minimum PII items required for each requested data processing activity as well as industry standards, if applicable, regarding the PII items regularly requested for each data processing activity listed in the user consent request.

Additionally or alternatively, verification data 606 includes historical consent data of users of the DM service. For example, DM server 102 may analyze historical consent data of its users to determine whether user consent is regularly provided by users for one or more items of requested PII and/or for one or more provided reason codes. Historical consent data of similarly situated users may be analyzed by DM server 102 to generate consent recommendation 602. Similarly situated users may include users who have previously submitted the same or similar type of service request 250 to the same or different requesting entity 202.

In embodiments where requesting entity 202 is registered, DM server 102 utilizes entity trust score 502 associated with requesting entity 202 to generate consent recommendation 602. As described above, with respect to FIG. 5, entity trust scores 502 are computed based on a plurality of datasets, such as user ratings data 504, compliance data 506, and security incident data 508. One or more of these datasets may be utilized by DM server 102 to generate consent recommendation 602.

In the example embodiment, consent recommendation 602 includes a recommended course of action (e.g., provide consent or refuse consent) regarding the PII items requested and each requested data processing activity. Consent recommendation 602 also includes a consent duration (e.g., consent time frame) for the provided user consent. Consent recommendation 602 may also provide an explanation regarding the reasoning behind each course of action recommended by DM server 102.

Figure 7:
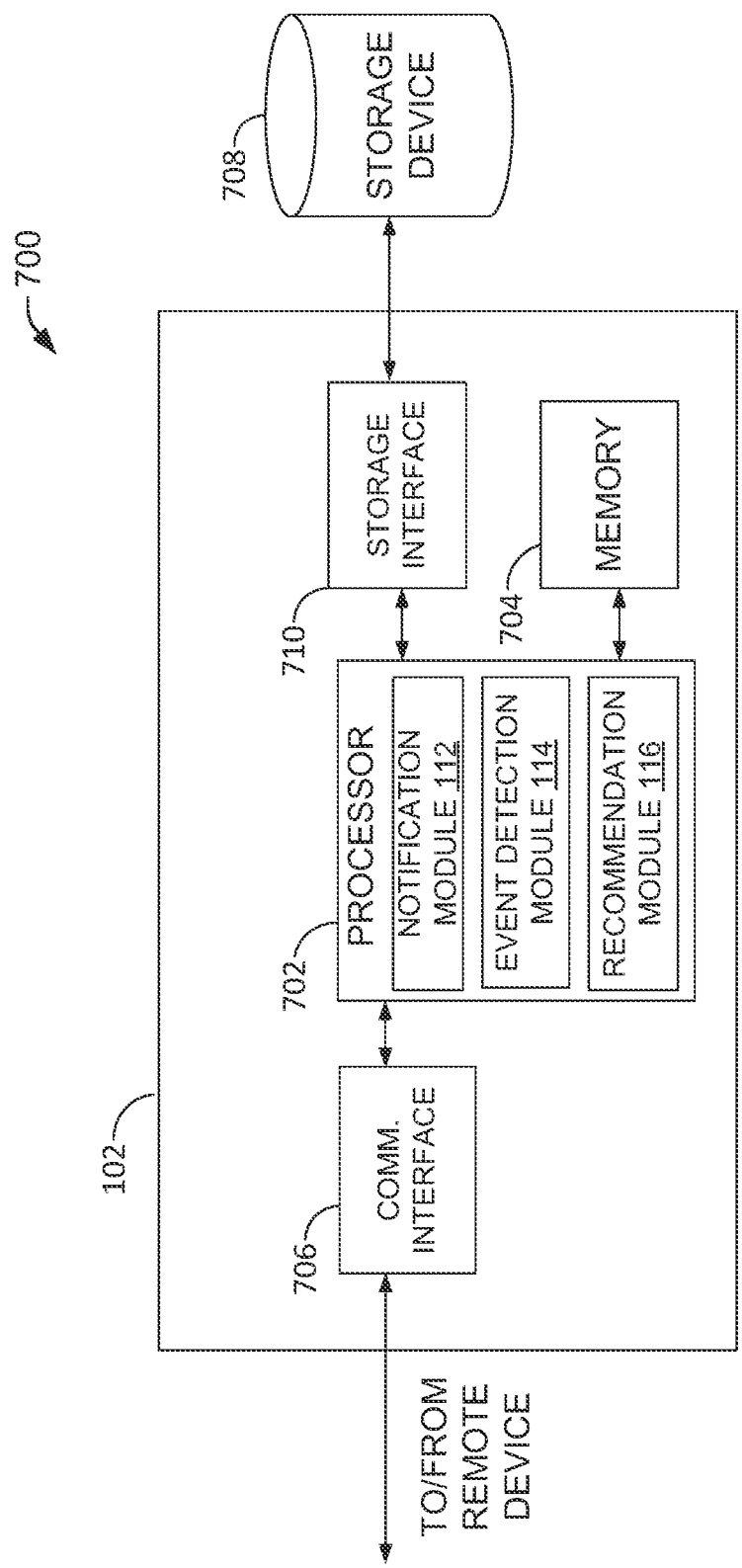

FIG. 7 depicts an example configuration 700 of a data management (DM) server 102 of DM computing system 100 (shown in FIG. 1). DM server 102 includes a processor 702 for executing instructions. Instructions may be stored in a memory area 704, for example. Processor 702 may include one or more processing units (e.g., in a multi-core configuration) configured to track data protection compliance of registered entities 108 (shown in FIG. 1).

In the exemplary embodiment, processor 702 is operable to execute modules, such as notification module 112, event detection module 114, and recommendation module 116. Modules 112, 114, and 116 may include specialized instruction sets and/or coprocessors. In the example embodiment, notification module 112 is utilized to generate consent request notifications and alert messages to a user. Notification module 112 may be utilized to perform a look up of a user's contact information in memory area 704 or storage device 708. Notification module 112 is utilized to transmit consent recommendations 602 to users (shown in FIG. 6), notification messages 354 requesting PII share requests 350 (shown in FIG. 3), and PII removal confirmation receipts 454 (shown in FIG. 4). In the example embodiment, event detection module 114 is utilized to detect security incidents and/or events that affects or may potential affect one or more users. Event detection module 114 may be utilized to receive, for example, data breach notifications from registered entities 108 (shown in FIG. 1).

Event detection module 114 may also be utilized to detect, based on compliance data 506 (shown in FIG. 5) of registered entities 108, a non-compliance event. Non-compliance events may include, for example, (i) sharing of a user's PII by requesting entity 202 to share-requesting entity 302 despite explicit refusal of consent by a user, (ii) using a user's PII for one or more data processing activities for which the user did not consent to, and (iii) refusing to delete stored PII data or discontinue storage of PII data in response to PII removal requests 450 (shown in FIG. 4). The detection of one or more non-compliance events triggers DM server 102 to transmit a notification to affected users using notification module 112. In the example embodiment, recommendation module 116 is utilized to generate consent recommendations 602. Recommendation module 116 is configured to utilize PII consent request data 604, verification data 606, and entity trust scores 502 to generate consent recommendations 602 for users.

Processor 702 is operatively coupled to a communication interface 706 such that DM server 102 is capable of communicating with a remote device such as one or more user computing devices 104 (shown in FIG. 1). For example, communication interface 706 may receive consent from users, such as PII user consent 256 (shown in FIG. 2) and PII share consent 356 (shown in FIG. 3). Communication interface 706 may also receive PII removal requests 450 from users (shown in FIG. 4).

Processor 702 may also be operatively coupled to a storage device 708. Storage device 708 is any computer-operated hardware suitable for storing and/or retrieving data. For example, databases 120 (shown in FIG. 1) may be implemented on storage device 708. In some embodiments, storage device 708 is integrated in DM server 102. For example, DM server 102 may include one or more hard disk drives as storage device 708. In other embodiments, storage device 708 is external to DM server 102 and may be accessed by a plurality of server computing devices. For example, storage device 708 may include multiple storage units such as hard disks or solid state disks in a redundant array of inexpensive disks (RAID) configuration. Storage device 708 may include a storage area network (SAN) and/or a network attached storage (NAS) system.

In some embodiments, processor 702 is operatively coupled to storage device 708 via a storage interface 710. Storage interface 710 is any component capable of providing processor 702 with access to storage device 708, such that any of modules 112, 114, and 116 are capable of communicating with databases 122. Storage interface 710 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 702 with access to storage device 708.

Memory area 704 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are for example only, and are thus not limiting as to the types.

Figure 8:
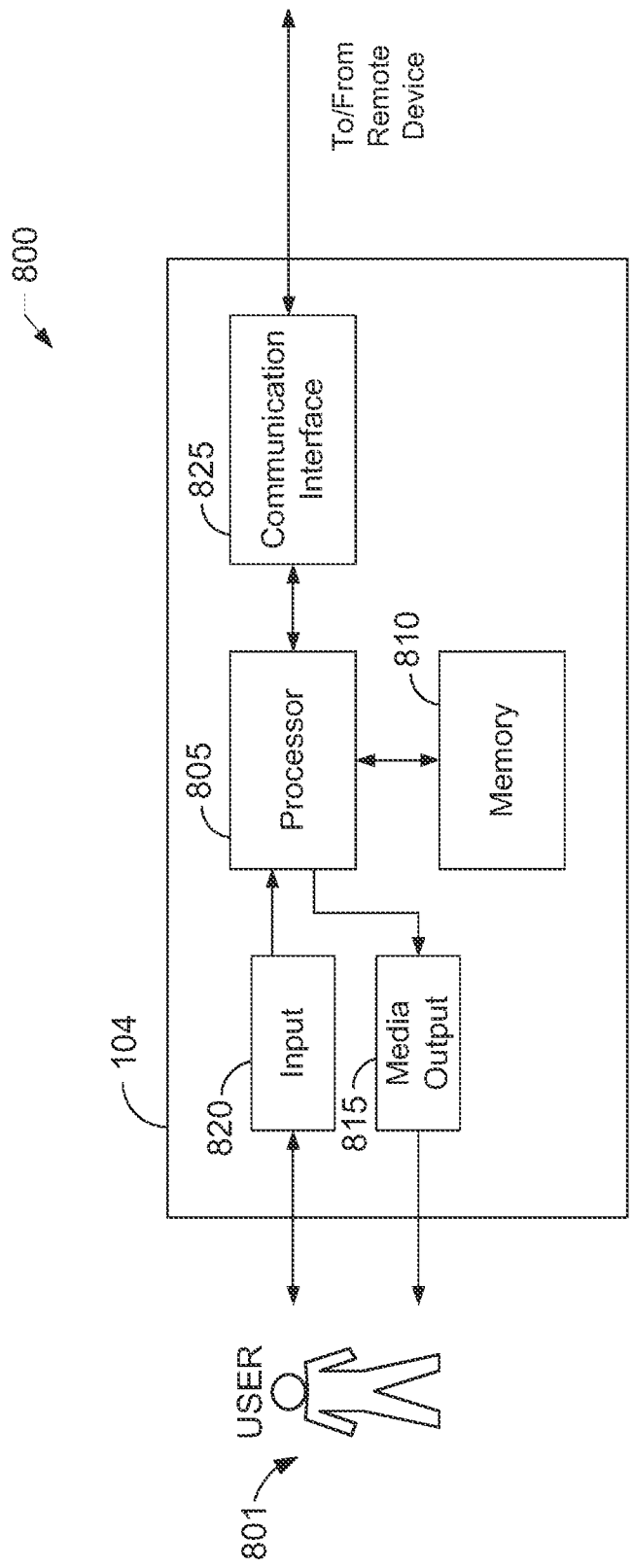

FIG. 8 depicts an example configuration 800 of user computing device 104 operated by a user 801 to access a DM service provided by DM server 102 (shown in FIG. 1). User 801 may perform an on-demand lookup using user computing device 104 to access information regarding the entities that are currently storing user's 801 PII data and the PII items accessed and stored by these entities. User 801 may also perform an on-demand lookup using user computing device 104 to access information regarding entities that have requested access to user's 801 PII items, but were previously declined by user 801. In the example embodiment, user computing device 104 may be used by user 801 to interact with DM computing system 100 (both shown in FIG. 1). More specifically, user computing device 104 may be used to access the DM service to enable user 801 to (i) view each registered entity 108 storing the user's PII, (ii) track user consent provided to entities 108, (iii) track each item of PII stored at each registered entity 108, (iv) manage user consent requests from requesting entities 202 (shown in FIG. 2), and (v) submit PII removal requests 450 (shown in FIG. 4) to registered entities 108.

In the example embodiment, user computing device 104 includes a processor 805 for executing instructions. In some embodiments, executable instructions are stored in a memory area 810. Processor 805 may include one or more processing units, for example, a multi-core configuration. Memory area 810 is any device allowing information such as executable instructions and/or written works to be stored and retrieved. Memory area 810 may include one or more computer readable media.

User computing device 104 also includes at least one media output component 815 for presenting information to user 801. Media output component 815 is any component capable of conveying information to user 801. In some embodiments, media output component 815 includes an output adapter such as a video adapter and/or an audio adapter. An output adapter is operatively coupled to processor 805 and operatively couplable to an output device such as a display device, a liquid crystal display (LCD), organic light emitting diode (OLED) display, or "electronic ink" display, or an audio output device, a speaker or headphones.

In some embodiments, user computing device 104 includes an input device 820 for receiving input from user 801. Input device 820 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 815 and input device 820. User computing device 104 may also include a communication interface 825, which is communicatively couplable to a remote device, such as DM server 102. Communication interface 825 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 810 are, for example, computer readable instructions for providing a user interface to user 801 via media output component 815 and, optionally, receiving and processing input from input device 820. A user interface may include, among other possibilities, a user interface for the DM application implemented as a web browser and/or a client application. Web browsers enable users, such as user 801, to display and interact with media and other information typically embedded on a web page or a website from DM computing system 100. A client application allows user 801 to interact with a server application from DM computing system 100, such as the DM service.

Figure 9:
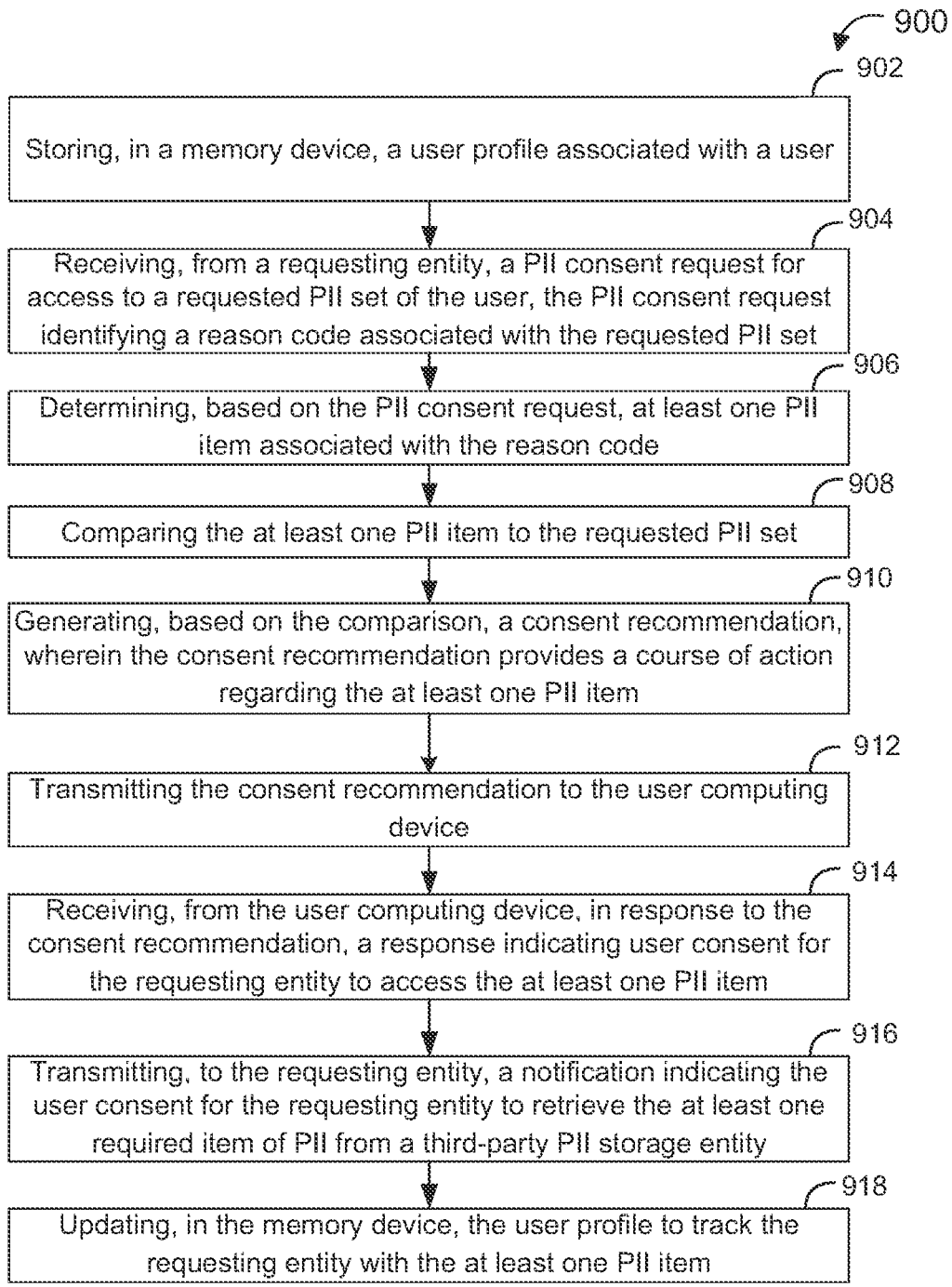

FIG. 9 is a flow diagram illustrating an example process 900 for tracking PII data protection compliance of a plurality of entities using DM computing system 100 (shown in FIG. 1). As described above, with respect to FIGS. 1 and 2, requesting entity 202 may be registered entity 108 or non-registered entity 110. Process 900 includes storing 902 a user profile associated with a user in a memory device for storing data. Process 900 also includes receiving 904, from a requesting entity, a PII consent request for access to a requested PII set of the user. The PII consent request may be PII the same or similar to PII consent request 252 (shown in FIG. 2). The PII consent request identifies a reason code associated with the requested PII set. Process 900 also includes determining 906 at least one PII item associated with the reason code based on the PII consent request. Process 900 also includes comparing 908 the at least one PII item to the requested PII set.

Process 900 further includes generating 910 a consent recommendation based on the comparison. The consent recommendation provides a course of action regarding the at least one PII item. The consent recommendation may be the same as or similar to PII recommendation 254 (shown in FIG. 2). Process 900 also includes transmitting 912 the consent recommendation to the user computing device. Process 900 also includes receiving 914, from the user computing device, in response to the consent recommendation, a response indicating user consent for the requesting entity to access the at least one PII item. Process 900 also includes transmitting 916, to the requesting entity, a notification indicating the user consent for the requesting entity to retrieve the at least one required item of PII from a third-party PII storage entity. Process 900 also includes updating 918, in the memory device, the user profile to track the requesting entity with the at least one PII item As will be appreciated based on the foregoing specification, the above-described examples of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed examples of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

This written description uses examples to describe embodiments of the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computing system for tracking data protection compliance of a plurality of entities using personally identifying information ("PII"), the computing system comprising a server in communication with a user computing device associated with a user and a requesting entity computing device associated with a requesting entity, the server comprising:
   a memory device for storing data, wherein the memory device includes a user profile associated with the user; and
   at least one processor communicatively coupled to the memory device, the at least one processor configured to:
      receive, from the requesting entity computing device, a PII consent request for access to a requested PII set of the user, the PII consent request identifying a reason code associated with the requested PII set;
      determine, based on the PII consent request, at least one PII item associated with the reason code;
      transmit, to the requesting entity, a notification indicating user consent for the requesting entity to retrieve the at least one PII item from a third-party PII storage entity;
      update, in the memory device, the user profile to track the requesting entity with the at least one PII item;
      receive, from the user computing device, a PII removal request indicating that the user revokes the user consent previously provided to the requesting entity;
      transmit, to the requesting entity, a removal notification including (i) the revoked user consent, (ii) an identification of the at least one PII item to be removed;
      monitor the requesting entity to determine a duration of time the requesting entity spent implementing the removal notification;
      receive, from the requesting entity, a removal compliance response in response to the removal notification, the removal compliance response indicating that the at least one PII item has been removed; and
      generate a consent recommendation associated with the requesting entity based on the monitoring.

2. The computing system of claim 1, wherein the at least one processor is further configured to determine a consent duration by analyzing a plurality of compliance records generated by the server to track interactions between the server and the requesting entity, the consent duration representing a recommended period of time for the requesting entity to access the at least one PII item.

3. The computing system of claim 1, wherein the at least one processor is further configured to:
   compare the at least one PII item to the requested PII set; and
   generate, based on the comparison, an initial consent recommendation, wherein the initial consent recommendation provides a course of action regarding the at least one PII item, and wherein the initial consent recommendation includes a consent duration.

4. The computing system of claim 3, wherein the at least one processor is further configured to:
   transmit the initial consent recommendation to the user computing device; and
   receive, from the user computing device, in response to the initial consent recommendation, a response indicating the user consent for the requesting entity to access the at least one PII item.

5. The computing system of claim 1, wherein the memory device includes a records database including a plurality of compliance records generated by the server to track interactions between the server and the requesting entity, and wherein the at least one processor is further configured to generate the consent recommendation by:
   parsing the records database for compliance records associated with the requesting entity to determine (i) a characteristic compliance rate and (ii) a characteristic compliance time; and
   recommending that the user provide the user consent based in part on the characteristic compliance rate and the characteristic compliance time satisfying a compliance criterion.

6. The computing system of claim 1, wherein the memory device includes a records database including a plurality of compliance records generated by the server to track interactions between the server and the requesting entity, and wherein the at least one processor is further configured to:
   generate a first compliance record including (i) a request date associated with the PII consent request, (ii) a consent date on which the user provided the user consent; and (iii) a description of the at least one PII item;

link the first compliance record with the user profile; and store the first compliance record in the records database.

7. The computing system of claim 1, wherein the at least one processor is further configured to:

receive, from the requesting entity, a PII share request to share the at least one PII item with a share-requesting entity, wherein the requesting entity is registered with the server and the share-requesting entity is not registered with the server;

transmit a share notification to the user computing device to alert the user of the PII share request;

receive, from the user computing device, in response to the share notification, a response indicating an additional user consent for the requesting entity to share the at least one PII item with the share-requesting entity; and transmit, to the requesting entity, an additional notification indicating the additional user consent.

8. A computer-implemented method for tracking data protection compliance of a plurality of entities using personally identifying information ("PII"), the method implemented by a computing system comprising a server in communication with a user computing device associated with a user and a requesting entity computing device associated with a requesting entity, the server comprising at least one processor communicatively coupled to a memory device including a user profile associated with the user, the method comprising:

receiving, from the requesting entity computing device, a PII consent request for access to a requested PII set of the user, the PII consent request identifying a reason code associated with the requested PII set;

determining, based on the PII consent request, at least one PII item associated with the reason code;

transmitting, to the requesting entity, a notification indicating user consent for the requesting entity to retrieve the at least one PII item from a third-party PII storage entity;

updating, in the memory device, the user profile to track the requesting entity with the at least one PII item;

receiving, from the user computing device, a PII removal request indicating that the user revokes the user consent previously provided to the requesting entity;

transmitting, to the requesting entity, a removal notification including (i) the revoked user consent, (ii) an identification of the at least one PII item to be removed;

monitoring the requesting entity to determine a duration of time the requesting entity spent implementing the removal notification;

receiving, from the requesting entity, a removal compliance response in response to the removal notification, the removal compliance response indicating that the at least one PII item has been removed; and generating a consent recommendation associated with the requesting entity based on the monitoring.

9. The computer-implemented method of claim 8 further comprising determining a consent duration by analyzing a plurality of compliance records generated by the server to track interactions between the server and the requesting entity, the consent duration representing a recommended period of time for the requesting entity to access the at least one PII item.

10. The computer-implemented method of claim 8 further comprising:

comparing the at least one PII item to the requested PII set; and generating, based on the comparison, an initial consent recommendation, wherein the initial consent recommendation provides a course of action regarding the at least one PII item, and wherein the initial consent recommendation includes a consent duration.

11. The computer-implemented method of claim 10 further comprising:

transmitting the initial consent recommendation to the user computing device; and receiving, from the user computing device, in response to the initial consent recommendation, a response indicating the user consent for the requesting entity to access the at least one PII item.

12. The computer-implemented method of claim 8, wherein the memory device includes a records database including a plurality of compliance records generated by the server to track interactions between the server and the requesting entity, and wherein generating the consent recommendation comprises:

parsing the records database for compliance records associated with the requesting entity to determine (i) a characteristic compliance rate and (ii) a characteristic compliance time; and recommending that the user provide the user consent based in part on the characteristic compliance rate and the characteristic compliance time satisfying a compliance criterion.

13. The computer-implemented method of claim 8, wherein the memory device includes a records database including a plurality of compliance records generated by the server to track interactions between the server and the requesting entity, and wherein the method further comprises:

generating a first compliance record including (i) a request date associated with the PII consent request, (ii) a consent date on which the user provided the user consent; and (iii) a description of the at least one PII item;

linking the first compliance record with the user profile; and storing the first compliance record in the records database.

14. The computer-implemented method of claim 8 further comprising:

receiving, from the requesting entity, a PII share request to share the at least one PII item with a share-requesting entity, wherein the requesting entity is registered with the server and the share-requesting entity is not registered with the server;

transmitting a share notification to the user computing device to alert the user of the PII share request;

receiving, from the user computing device, in response to the share notification, a response indicating an additional user consent for the requesting entity to share the at least one PII item with the share-requesting entity; and transmitting, to the requesting entity, an additional notification indicating the additional user consent.

15. At least one non-transitory computer-readable storage medium of a server comprising at least one processor and a memory device including a user profile associated with a user, the server in communication with a user computing device associated with the user and a requesting entity computing device associated with a requesting entity, the computer-readable storage medium including computer-executable instructions for tracking data protection compliance of a plurality of entities using personally identifying information ("PII"), wherein when the computer-executable instructions are executed by the at least one processor of the server, the computer-executable instructions cause the at least one processor to:

receive, from the requesting entity computing device, a PII consent request for access to a requested PII set of the user, the PII consent request identifying a reason code associated with the requested PII set;

determine, based on the PII consent request, at least one PII item associated with the reason code;

transmit, to the requesting entity, a notification indicating user consent for the requesting entity to retrieve the at least one PII item from a third-party PII storage entity;

update, in the memory device, the user profile to track the requesting entity with the at least one PII item;

receive, from the user computing device, a PII removal request indicating that the user revokes the user consent previously provided to the requesting entity;

transmit, to the requesting entity, a removal notification including (i) the revoked user consent, (ii) an identification of the at least one PII item to be removed;

monitor the requesting entity to determine a duration of time the requesting entity spent implementing the removal notification;

receive, from the requesting entity, a removal compliance response in response to the removal notification, the removal compliance response indicating that the at least one PII item has been removed; and generate a consent recommendation associated with the requesting entity based on the monitoring.

16. The at least one non-transitory computer-readable storage medium of claim 15, wherein the computer-executable instructions further cause the at least one processor to determine a consent duration by analyzing a plurality of compliance records generated by the server to track interactions between the server and the requesting entity, the consent duration representing a recommended period of time for the requesting entity to access the at least one PII item.

17. The at least one non-transitory computer-readable storage medium of claim 16, wherein the computer-executable instructions further cause the at least one processor to:
compare the at least one PII item to the requested PII set; and
generate, based on the comparison, an initial consent recommendation, wherein the initial consent recommendation provides a course of action regarding the at least one PII item, and wherein the initial consent recommendation includes a consent duration.

18. The at least one non-transitory computer-readable storage medium of claim 15, wherein the memory device includes a records database including a plurality of compliance records generated by the server to track interactions between the server and the requesting entity, and wherein the computer-executable instructions further cause the at least one processor to generate the consent recommendation by:
parsing the records database for compliance records associated with the requesting entity to determine (i) a characteristic compliance rate and (ii) a characteristic compliance time; and
recommending that the user provide the user consent based in part on the characteristic compliance rate and the characteristic compliance time satisfying a compliance criterion.

19. The at least one non-transitory computer-readable storage medium of claim 15, wherein the memory device includes a records database including a plurality of compliance records generated by the server to track interactions between the server and the requesting entity, and wherein the computer-executable instructions further cause the at least one processor to:
generate a first compliance record including (i) a request date associated with the PII consent request, (ii) a consent date on which the user provided the user consent; and (iii) a description of the at least one PII item;
link the first compliance record with the user profile; and
store the first compliance record in the records database.

20. The at least one non-transitory computer-readable storage medium of claim 15, wherein the computer-executable instructions further cause the at least one processor to:
receive, from the requesting entity, a PII share request to share the at least one PII item with a share-requesting entity, wherein the requesting entity is registered with the server and the share-requesting entity is not registered with the server;
transmit a share notification to the user computing device to alert the user of the PII share request;
receive, from the user computing device, in response to the share notification, a response indicating an additional user consent for the requesting entity to share the at least one PII item with the share-requesting entity; and
transmit, to the requesting entity, an additional notification indicating the additional user consent.

* * * * *